US008683366B2

(12) United States Patent
Hammer et al.

(10) Patent No.: US 8,683,366 B2
(45) Date of Patent: Mar. 25, 2014

(54) FIELD DEVICE WITH MEANS FOR PERFORMING DIAGNOSTIC METHODS

(75) Inventors: Manfred Hammer, Wehr (DE); Dietmar Spanke, Steinen (DE); Herbert Schroth, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 423 days.

(21) Appl. No.: 12/663,839

(22) PCT Filed: Jun. 4, 2008

(86) PCT No.: PCT/EP2008/056899
§ 371 (c)(1),
(2), (4) Date: Dec. 9, 2009

(87) PCT Pub. No.: WO2008/151971
PCT Pub. Date: Dec. 18, 2008

(65) Prior Publication Data
US 2010/0169816 A1    Jul. 1, 2010

(30) Foreign Application Priority Data
Jun. 11, 2007   (DE) .......................... 10 2007 027 276

(51) Int. Cl.
*G06F 3/048*    (2013.01)
(52) U.S. Cl.
USPC ........... 715/771; 715/965; 700/108; 700/143; 700/183
(58) Field of Classification Search
USPC .......... 715/710, 740, 771, 831, 965; 700/108, 700/143, 183; 702/183
See application file for complete search history.

(56) References Cited

U.S. PATENT DOCUMENTS

| | | | |
|---|---|---|---|
| 5,311,562 A * | 5/1994 | Palusamy et al. | 376/215 |
| 5,844,795 A | 12/1998 | Johnston | |
| 6,298,308 B1 | 10/2001 | Reid | |
| 6,397,114 B1 | 5/2002 | Eryurek | |
| 7,003,417 B2 * | 2/2006 | Koukol et al. | 702/88 |
| 7,024,319 B2 * | 4/2006 | Mueller et al. | 702/55 |

(Continued)

FOREIGN PATENT DOCUMENTS

| | | |
|---|---|---|
| EP | 0 816 959 | 1/1998 |
| WO | WO 02/054162 | 7/2002 |

OTHER PUBLICATIONS

"Alert Analysis Systems. Machine Condition Assessment Software", internet citation, 2004, pp. 1-6, XP007906185.

*Primary Examiner* — Shen Shiau
(74) *Attorney, Agent, or Firm* — Bacon & Thomas, PLLC

(57) ABSTRACT

A field device is able to diagnose a broad spectrum of possible faults and/or states, and includes: structure for performing user defined, diagnostic methods; which has an input circuit, via which at least one input variable is fed to the structure; which has an evaluation unit, which serves for deriving, on the basis of at least one input variable selected by the user and at least one evaluating method selected by the user, at least one characterizing variable; which has a monitoring unit, which monitors the derived characterizing variables on the basis of monitoring criteria selected by the user; and which has an output unit, which, upon the meeting of a monitoring criterion, outputs a diagnosis associated with such monitoring criterion; and an interface, via which a user selects the input variables for each user defined diagnostic method, selects the evaluating methods to apply to the input variables, selects the monitoring criteria, and specifies the diagnosis.

9 Claims, 2 Drawing Sheets

(56) References Cited

U.S. PATENT DOCUMENTS

| | | |
|---|---|---|
| 7,050,863 B2 * | 5/2006 | Mehta et al. .................... 700/29 |
| 2002/0173929 A1 * | 11/2002 | Seigel .......................... 702/130 |
| 2004/0083009 A1 * | 4/2004 | Curless et al. .................... 700/1 |
| 2006/0015294 A1 * | 1/2006 | Yetter et al. .................. 702/183 |
| 2006/0026480 A1 * | 2/2006 | Logisch ....................... 714/738 |
| 2006/0058898 A1 * | 3/2006 | Emigholz et al. ............... 700/29 |
| 2006/0100807 A1 * | 5/2006 | Koukol et al. .................. 702/88 |
| 2006/0155501 A1 * | 7/2006 | Hempel ...................... 702/118 |
| 2007/0109143 A1 * | 5/2007 | Klofer et al. .................. 340/665 |
| 2008/0065706 A1 * | 3/2008 | Miller et al. .................. 707/205 |
| 2008/0082299 A1 * | 4/2008 | Samardzija et al. .......... 702/187 |

* cited by examiner

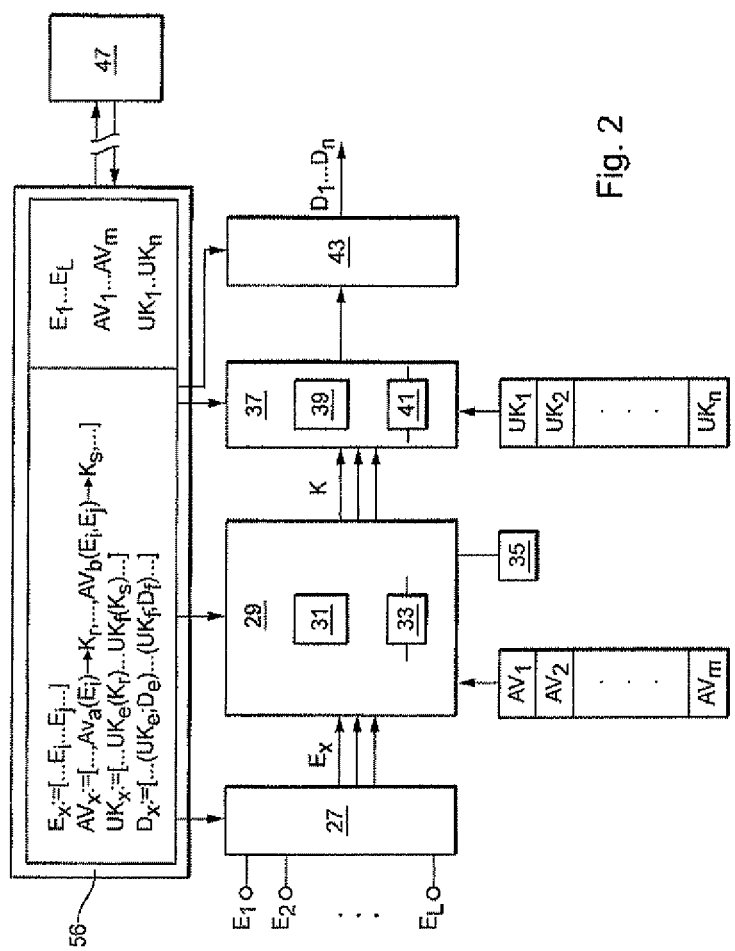

FIELD DEVICE WITH MEANS FOR PERFORMING DIAGNOSTIC METHODS

TECHNICAL FIELD

The invention relates to a field device with means for performing diagnostic methods and a method for implementing diagnostic methods in such a field device.

BACKGROUND DISCUSSION

In industrial measurements technology, especially in automation and process control technology, field devices are regularly applied, which, in the course of a process, measure (sensors) process variables or control (actuators) control variables.

Field devices include measuring devices measuring e.g. flow, fill level, pressure, pressure difference and/or temperature. They are, as a rule, arranged decentrally, in the immediate vicinity of the process component to be measured or controlled, and deliver a measurement signal corresponding to the measured value of the registered process variable. The measuring signals of the field devices are forwarded to a superordinated unit, e.g. a central, control unit, such as e.g. a control room or a process control system. As a rule, the entire process control occurs via the superordinated unit, which receives and evaluates the measuring signals of the individual measuring devices and, as a function of their evaluation, produces control signals for the actuators, which control the process flow. In this way, for example, flow through a pipeline section can be tuned by means of a controllable valve as a function of a measured flow.

A faultless, frictionless working of field devices is of great importance for the safety of applications, in which they are applied. Correspondingly, the functional ability of field devices is exactly monitored and occurring faults are displayed in the form of fault reports, e.g. as a warning or an alarm. Preferably, the field device monitors itself. Thus, the field device performs self monitoring and/or diagnosis.

For this, field devices of today can be equipped with means for performing diagnostic methods. Such are able, on the basis of input variables available in the field device, to diagnose the occurrence of certain faults or states of the field device. For this, the input variables are analyzed on the basis of evaluating methods permanently implemented in the field device and monitoring criteria indicating occurrence of the fault or state are monitored. If such a monitoring criterion is met, the field device outputs the associated diagnosis.

Field devices of this type are described, for example, in U.S. Pat. No. 6,397,114 B1. As described there field devices are able to diagnose and report predetermined faults or states on the basis of input variables available in the field device, wherein the input variables are subjected to fixedly predetermined evaluating methods, the results of which are then monitored on the basis of fixedly predetermined monitoring criteria.

Today's diagnostic methods are predetermined in the field device factory and are limited, as a rule, to the detecting of field device specific faults or states.

There are, however, a very large number of faults or states, which are application-specific and are, with today's diagnostic abilities of the field device either not registered at all or else are not sufficiently exactly analyzed, evaluated and/or interpreted.

A reason for this is that manufacturers of field devices, as a rule, do not know in advance, where and how the field device will be applied. Correspondingly, the manufacturer does not know which faults or states are relevant for the user at the location of use, and which meaning should be attributed to them there.

In these cases, users have, in the past, frequently helped themselves by loading all input variables relevant for an application-specific fault and/or state via corresponding connection lines or interfaces from the field device into a superordinated unit, e.g. a process control system, and there centrally further processed and evaluated the input variables corresponding to the requirements of the special application. This is, however, relatively complicated, since the user, for this, as a rule, must create its own software and implement such in the superordinated unit. Moreover, there arises thereby, in given cases, a not insignificant data flow between the field device and the superordinated unit, which under circumstances blocks otherwise required interfaces and/or occupies transmission capacities. A further disadvantage is that the number of input variables, which can be output via connection lines and/or interfaces from the field device, is very limited.

SUMMARY OF THE INVENTION

It is an object of the invention to provide a field device, that is able to diagnose a broad spectrum of possible faults and/or states.

To this end, the invention resides in a field device, including:
  means for performing user defined diagnostic methods,
    which has an input circuit, via which the means is fed at least one input variable,
    which has an evaluation unit,
    which serves, on the basis of at least one input variable selected by the user and at least one evaluating method selected by the user, for deriving at least one characterizing variable,
    which has a monitoring unit,
    which monitors the derived characterizing variable on the basis of monitoring criteria selected by the user, and
    which has a diagnostic output, which, upon the meeting of a monitoring criterion, outputs a diagnosis associated with such monitoring criterion, and
  an interface,
    via which a user, for each user defined diagnostic method, selects the input variables,
    selects the evaluating methods to apply on the input variables,
    selects the monitoring criteria, and
    specifies the diagnosis.

In a further development, each evaluating method is implemented as a modularly insertable function block and each monitoring criterion as a module in the field device.

In an embodiment, the invention comprises a field device, wherein
  at least one memory is provided, in which are listed the available input variables, the available evaluating methods, and the available monitoring criteria,
  the interface is connected with a display, which serves for reporting to the user the available input variables, the available evaluating methods and the available monitoring criteria, and
  the interface is connected with an input means, via which the user, for each user defined diagnostic method, specifies the associated input variables, evaluating methods, monitoring methods, and the diagnosis.

In an embodiment, the evaluating methods comprise static evaluations and the monitoring criteria comprise comparisons and/or logic operations.

In a further development, associated with the evaluation unit is an internal clock.

In an embodiment, the interface is connected with a user interface having a display and an input means arranged directly on the field device.

In a further development, the diagnosis comprises a report, which is predetermined by the user as regards content, stored in a memory in the field device, and identifying the fault or state to be diagnosed. Preferably, the diagnosis comprises, supplementally, as predetermined by the user regarding content and stored in a memory in the field device, a cause and/or a corrective measure, which are/is output together with the associated report.

Additionally, the invention resides in a method for implementing a user defined diagnostic method in a field device of the invention, wherein the user selects from available input variables, and stores in the field device, the input variables relevant for the diagnosis, the user selects from available evaluating methods the methods relevant for the diagnostic method and specifies, on which of the selected input variables they should be applied, the user selects from available monitoring criteria the monitoring criteria relevant for the diagnostic method and specifies the characterizing variable, to which they should be applied, and the user specifies, for each monitoring criterion, an associated diagnosis, which, upon the meeting of such monitoring criterion, is to be output by the diagnostic output.

BRIEF DESCRIPTION OF THE DRAWINGS

The invention and other advantages thereof will now be explained in greater detail on the basis of the drawing, in which an example of an embodiment is presented; equal elements are provided in the figures with equal reference characters. The figures of the drawing show as follows:

FIG. 2 the means for performing user defined diagnostic methods.

DETAILED DISCUSSION IN CONJUNCTION WITH THE DRAWINGS

Figure 1:
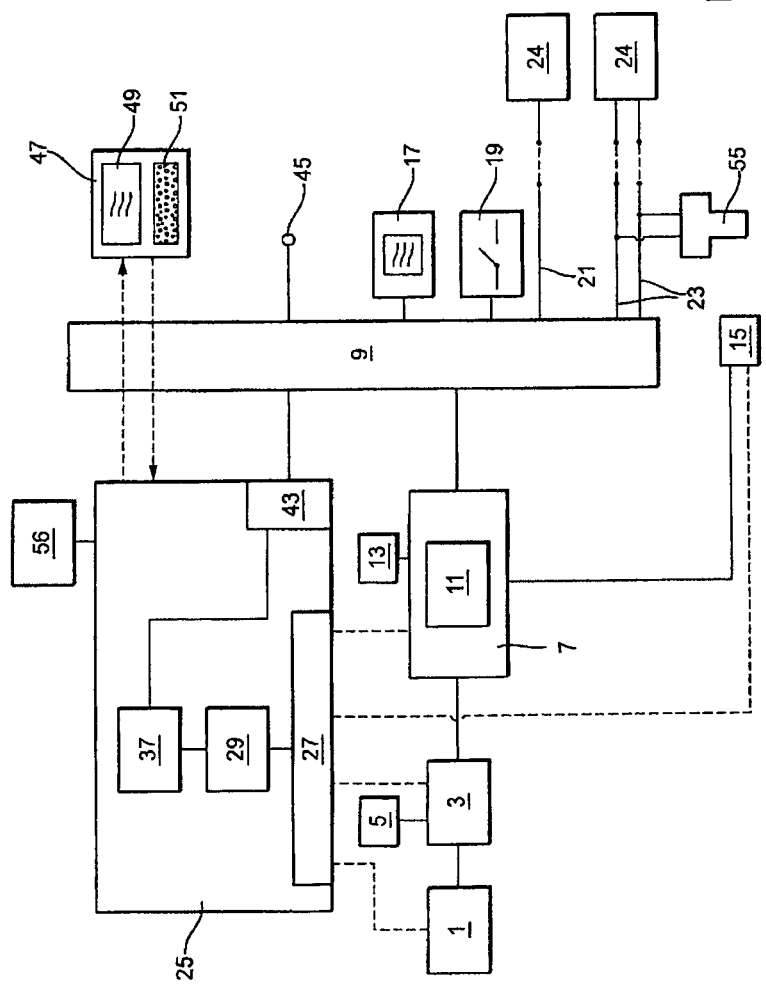
FIG. 1 a block diagram of a field device of the invention, with means for performing user defined diagnostic methods.

FIG. 1 shows a simplified block diagram of a field device of the invention. The illustrated example of an embodiment involves a measuring device, including a sensor 1 for registering a physical, measured variable, e.g. a fill level, a pressure or a temperature, and for producing a sensor signal corresponding to the physical, measured variable.

An important class is represented, in such case, by the fill level measuring devices working according to the travel time principle. These determine the fill level of a fill substance in a container by sending electromagnetic signals or ultrasonic waves to the surface of the fill substance and receiving their echo back. A travel time is ascertained, which the signals require for traveling the path to the surface of the fill substance and back, and, therefrom, fill level is ascertained.

Fill-level measuring devices working with electromagnetic signals are divided into two classes; a first class, in the case of which the electromagnetic signals sent by means of an antenna in the direction of the fill substance are reflected on the surface of the fill substance and then, after a distance dependent travel time, received back; and a second class, in the case of which the electromagnetic signals are guided along a waveguide in the direction of the fill substance, reflected on the surface of the fill substance due to the there existing impedance jump, whereupon the reflected signals are guided along the waveguide back out of the container and received back after a distance dependent travel time.

Connected to the sensor 1 is a signal conditioning unit 3, which conditions the sensor signal for further processing and/or evaluation. The signal conditioning unit 3 can provide, for example, filtering, amplification and/or digitizing of the sensor signal. Additionally, compensation of measurement errors, such as e.g. temperature dependent deviations, can be performed. For this, for example, parameters, characteristic curves and/or calibration data stored in a memory 5 can be taken into consideration.

The conditioned sensor signal is fed to a signal processing unit 7, which ascertains, on the basis of the conditioned sensor signal, the physical variable to be measured, and makes available a corresponding output signal via an output unit 9 of the field device.

The signal processing unit 7 includes preferably an electronic unit 11, e.g. a microprocessor, to which the conditioned sensor signal is fed.

The electronic unit 11 ascertains the variable to be measured, for example, on the basis of programs stored in a memory 13, taking into consideration, for example, likewise, parameters, characteristic curves and/or calibration data stored in the field device, e.g. in the memories 5 and/or 13.

Additionally, the signal processing unit 7 can be fed other information for determining the physical variable. This information can be derived within the field device or fed via corresponding interfaces 15 from the outside. Examples of such information are additional measured variables or manipulated variables, which, for example, are derived internally in the field device, e.g. from additional sensors, or are fed via the interface 15 from the outside.

Field devices are commercially obtainable today in combination with a large number of different types of outputs. Some types are illustrated in FIG. 1, for example, and can be provided both along with one another as well as also alternatively relative to one another. The output unit 9 includes, for example, an on-site display 17, a relay 19, or connection lines 21, 23, via which the output signal is suppliable in analog or digital form to a superordinated unit 18, e.g. a programmable logic controller (PLC), a process control system (PCS) or a personal computer (PC).

The output of a digital output signal can occur, for example, via a data bus conductor, here the connection line 21, connected to the output unit 9. Known international standards for this type of signal transmission include Profibus, Foundation Fieldbus or CAN bus.

Output of analog output signals occurs very frequently via a line-pair, here the two connection lines 23, connected to the output unit 9. Via the line-pair, both the energy supply of the field device as well as also output of the output signal occurs. These devices are frequently referred to as 2-wire devices. According to standard, such devices are fed with input voltages of 12 V up to a maximum of 36 V, and the field device controls, as a function of an instantaneous measured value, an electrical current flowing via the line-pair. The output signal is, in the case of these field devices, a signal current. In a standard usual in measurements and control technology, the signal current is set, as a function of the instantaneous measured value, to values between a minimum signal current of 4 mA and a maximum signal current of 20 mA. Additionally, there can be superimposed on the signal current a communication signal, via which a bidirectional communication with the field device can occur. Also for this, there are standards, such as e.g. HART, usual in measurements and control technology.

The field device according to the invention includes a means for performing user defined, diagnostic methods. The means 25 can be a component of the signal processing unit 7; it can, however, also be embodied as an independent unit. Alternatively, naturally, also a number of decentralized subunits can be arranged at functionally relevant locations in the field device and connected with one another. In the example of an embodiment illustrated in FIG. 1, means 25 is shown as a separate unit. Means 25 is shown in detail in FIG. 2.

Means 25 includes an input circuit 27, via which it is fed at least one input variable E. In FIG. 2, L input variables $E_1 \ldots E_L$ are shown. An example of an input variable E is the sensor signal, which can be fed to the input circuit 27 as a raw signal or as a conditioned signal. In the case of fill-level measuring devices working according to the travel time principle, this is, for example, the received echo signal, which, as raw signal or in conditioned form, e.g. in the form of an envelope curve derived therefrom, is fed as input signal E. Other input variables E include additional measuring, or manipulated, variables, which can be derived, for example, internally in the field device, e.g. from additional sensors, such as e.g. temperature sensors, or which are fed via the interface 15 from the outside. With a temperature sensor, for example, the temperature of the measuring device electronics can be ascertained and made available as input variable E.

Other input variables E include, for example, measurement results, such as e.g. a current pressure or fill level, as derived by the field device. In connection with the initially named, fill-level measuring devices working according to the travel time principle, e.g. the echo amplitudes of individual echoes, especially the amplitudes of wanted, and/or disturbing, echoes, as well as the signal to noise ratio, are important input variables E. If a waveguide is applied for guiding the electromagnetic signals, then travel time, amplitude and/or sign of an echo arising, in given cases, from reflection at the end of the waveguide, represent other very relevant input variables E. Supply of the input variables E is shown symbolically in FIG. 1 by dashed lines.

The available input variables E can be fed in the means 25 to individual, or a plurality of, evaluating methods EM. The evaluating methods $EM_1 \ldots EM_m$ available for this are implemented in the field device as modularly insertable function blocks, which serve for executing the pertinent evaluating methods EM.

Connected to the input circuit 27 is an evaluating unit 29, which serves, on the basis of at least one input variable E selected by the user and at least one evaluating method EM selected by the user, for deriving at least one characterizing variable K. The evaluating methods EM include, especially, average value formings, integral formings, sum formings, the determining of extreme values, such as minimum and maximum, the ascertaining of number or frequency of zero traverses, the derivation of correlation functions or Fourier-transformations, as well as the determining of frequencies and/or amplitudes of the input variables E.

Especially in the case of fill-level measuring devices working according to the travel time principle, also evaluating methods EM can be provided, which, on the basis of the echo signals supplied as input variables E, ascertain e.g. the echo amplitudes of individual echoes, especially the amplitudes of wanted, and/or disturbing, echoes, as well as the signal to noise ratio. If a waveguide is applied for guiding the electromagnetic signals, then, furthermore, evaluating methods can be provided, which derive travel time, amplitude and/or sign of an echo arising, in given cases, from a reflection on the end of the waveguide on the basis of the echo signal available as input variable E. These evaluating methods EM, naturally, only make sense, when the corresponding variables to be determined by them are not already available as input variables E.

The individual evaluating methods EM are permanently implemented in associated function blocks in the field device and are activated by corresponding specifications of the user and applied to input variables E selected by the user.

For this, the evaluating methods EM can be present in the field device e.g. in the form of software modules, which are executed by a microprocessor 31 provided in the evaluating unit 29. The input variables E are fed to the microprocessor in digital form. Alternatively, individual or all evaluating methods EM can also be executed by circuits 33 specially provided for such, which are correspondingly activated by inputs of the user. For example, conventional, prefabricated chips can be applied, which are specially designed for the execution of certain tasks. Examples of this are digital signal processors for performing Fourier transformations and filter or similar components, which are applicable, for example, for signal selection and subsequent processing, e.g. average formation.

Preferably, an internal clock 35 is associated with the evaluation unit 29. In this way, the opportunity is provided for time dependent evaluations, such as e.g. average formation over a predetermined period of time, or determining, by corresponding evaluating methods EM, the speed with which an input variable E, such as e.g. a measured fill level, or a characterizing variable K, e.g. the amplitude of a measurement signal, derived from an input variable E, change with respect to time.

Additionally, the clock time available via this internal clock 35 can be made available as another input variable E.

According to the invention, the user determines by corresponding specifications to the field device, which input variables E in the field device are subject to which evaluation methods EM, and establishes therewith type and number of characterizing variables K available at the output of the evaluation unit 29. This can occur, for example, in such a manner, that an input variable E is subjected to an evaluating method EM, which then directly produces the desired characterizing variable K. Alternatively, an input variable E can be subjected to a plurality of evaluating methods EM, wherein each evaluating methods EM produces, in each case, a characterizing variable K. Likewise, on option is to apply a number of evaluating methods EM, one after the other, wherein one or more characterizing variables K produced by an evaluating method EM are taken into consideration as input variables E for a further evaluating method EM.

The characterizing variables K are fed to a monitoring unit 37. Available for the user in the monitoring unit 37 are monitoring criteria MK, with which the characterizing variables K can be checked. The monitoring criteria MK are implemented in the field device as modules $MK_1 \ldots MK_n$, which serve for monitoring the meeting of the pertinent monitoring criterion MK.

Such a monitoring criterion MK is, for example, the exceeding or subceeding (falling beneath) of a threshold defined by the user. A monitoring criterion MK can, such as indicated above, contain a single condition; it can, however, also be composed of a plurality of subcriteria, which are, for example, combined with one another by logic operations, such as e.g. AND, and/or OR, operations, to become one criterion. Likewise, the user has the opportunity to combine a number of monitoring criteria MK with one another through a further monitoring criterion MK or through logic operations.

The monitoring criteria MK can be present e.g. in the form of software modules in the field device, which are checked by a microprocessor 39 provided in the monitoring unit 37. The characterizing variables K generated according to the inputs of the user are fed to the microprocessor 39 in digital form. Alternatively, individual or all monitoring criteria MK also can be checked by circuits 41 provided specially for this, which are activated corresponding to the specifications of the user. For this, for example, conventional prefabricated chips, such as e.g. comparators, can be applied.

Connected to the monitoring unit 37 is a diagnostic output 43, which, upon the meeting of a monitoring criterion MK, such as e.g. the exceeding of a threshold value, outputs a diagnosis D associated with such monitoring criterion MK. The diagnosis D to be furnished upon the meeting of the particular monitoring criterion MK is predetermined earlier by the user and stored in a memory 56. The diagnosis D comprises, for example, a report predetermined by the user as regards content, stored in the memory 56 and referring to the fault or state to be diagnosed, such as e.g. 'amplitude of the sensor signal exceeds limit value'. Additionally, each diagnosis D comprises preferably a cause and/or a corrective measure likewise predetermined by the user as regards content, stored in the memory 56 and output together with the report, as a component of the diagnosis D.

The user knows the process of the user, as a rule, very exactly, and knows, consequently, which input variables E contain important information for the application of the user and in which way this information can be obtained. The user has, through the field device of the invention, now, for the first time, the opportunity to have this information be directly ascertained by the field device by the defining of a corresponding, user defined, diagnostic method and be displayed in the form of a diagnosis D optimally matched to the application of the user. In the diagnosis D can be incorporated both the name of the fault or state, as well as also its cause, as well as possible corrective measures.

The output of the diagnosis D occurs preferably via the output unit 9. For this, the output unit 9 can have a separate output 45, via which the diagnoses D are output. They can, however, also be transmitted via the same output, via which also the measurement signal is transmitted, by outputting it, for example, via the bus, line 21, or superimposing it on the signal current in the connection lines 23 in the form of a communication signal.

The field device includes an interface 47, via which a user, for each user defined diagnostic method X desired by the user, selects the input variables $E_x$, selects the evaluating methods $EM_x$ to apply to the input variables $E_x$, selects the monitoring criteria $MK_x$, and specifies the diagnosis $D_x$.

Interface 47 is connected in the example of an embodiment illustrated in FIG. 1 with a user interface arranged directly on the field device and having a display 49 and an input means 51, e.g. a keypad. Interface 47 is connected to the output unit 9 and permits via the output unit 9 a bidirectional communication with the field device. Via this bidirectional connection, the user receives information required for specification of the user defined, diagnostic method. Depending on embodiment of the field device, however, also other types of interfaces can be provided. Preferably used for these interfaces are those which the field device has available in any event.

In the case of field devices, in which the output unit 9 has available, outputs, which provide bidirectional communication between the field device and the superordinated unit 24, the interface can be integrated, for example, in the superordinated unit 24. There is provided, in any event, regularly, a user interface with a display and an input means, via which the user communicates with the field device. The user receives, in this case, via the superordinated unit 24, the opportunity to specify the user defined diagnostic method.

Alternatively, suited as interface is a mobile operating, or servicing, tool 55 connectable to the connection lines 23 of the output unit 9 for communicating with the field device via a communication signal superimposed on the signal current.

Provided in the field device is at least one memory 56, in which are listed, available for the user defined diagnostic method, the input variables $E_1 \ldots E_L$, the evaluating methods $EM_1 \ldots EM_m$ and the monitoring criteria $MK_1 \ldots MK_n$. The interface 47 includes a display, (here, for example, the display 49), which serves for reporting to the user the available input variables $E_1 \ldots E_L$, the available evaluating methods $EM_1 \ldots EM_m$ and the available monitoring criteria $MK_1 \ldots MK_n$, and it includes an input means, here the input means 51, via which the user specifies, for each user defined, diagnostic method X the associated input variables $E_x$, evaluating methods $EM_x$ monitoring criteria $MK_x$, and diagnosis D. These specifications are stored in the field device, e.g. in the memory 56, where they are accessed by the evaluation unit 29, the monitoring unit 37 and the diagnostic output 43.

The implementing of a user defined diagnostic method occurs preferably in menu guided form in the context of the start-up of the field device. In such case, the procedure is preferably that the user places the field device in a mode for implementing a user defined diagnostic method. In this mode, first the available input variables $E_1 \ldots E_L$ listed in the memory 56 are displayed to the user. In a next step, the user selects from available input variables $E_1 \ldots E_L$ the input variables $E_x$ relevant for the diagnostic method X of the user and stores these in the field device, here in the memory 56. Then, displayed to the user are the available evaluating methods $EM_1, \ldots EM_m$ listed in the memory 56. The user selects from available evaluating methods $EM_1 \ldots EM_m$ the evaluating methods $EM_x$ relevant for the diagnostic method X of the user and specifies, to which of the selected input variables $E_x$ they should be applied. These specifications are likewise stored in the memory 56. Examples of this are presented in FIG. 2. From this result, directly, type and number of characterizing variables $K_x$ to be produced by the evaluating unit 29 in the context of this diagnostic method X. This can be ascertained automatically by the field device, for example, by a corresponding software module implemented in the field device. If an evaluating method EM is selected, for whose execution additional information is required, such as e.g. a time period, over which an average forming is to be performed, threshold values, reference values or reference variables, then the user is requested, directly after selection of such evaluation method EM, to supplement the required information by corresponding inputs. In a next step, the user selects, from available monitoring criteria $MK_1 \ldots MK_n$, the monitoring criteria $MK_x$ relevant for the diagnostic method X of the user and specifies thereto in each case the characterizing variable K, to which it should be applied. In order to reduce clutter for the user, this step can, for example, be executed in such a manner, that the field device ascertains, internally, type and number of the characterizing variables $K_x$, and displays to the user for each characterizing variable K, from which input variables E it comes and from which evaluating methods EM it is produced, and the user acknowledges each of these displays by selecting the monitoring criteria MK to apply to the particular characterizing variable K. Also, these specifications are then correspondingly stored in the memory in the field device. If a monitoring criterion MK is selected, for whose embodiment additional information, such as e.g. threshold values, reference values or reference variables are required, then the user is asked, directly after selection of the monitoring criterion MK, to supplement the required information by corresponding inputs.

In a last step, the user specifies, for each monitoring criterion $MK_x$ to be executed, an associated diagnosis $D_x$, which is output by the diagnostic output 43, upon the meeting of such monitoring criterion $MK_x$. For this, there is, for example, a report text, which refers to the diagnosed fault or state. Additionally, the text can contain the cause of the fault or state and/or a statement of a corrective measure. Such a report text can, for example, read: Rate of change of fill level too small; supply line plugged; please perform system cleaning'.

Additionally, each diagnosis $D_x$ can be combined with a safety directed reaction of the field device upon the occurrence of the particular state or fault. The reaction is triggered in the device by the corresponding diagnosis $D_x$. Such a reaction is, for example, the triggering of an alarm or the freezing of the measurement results. These types of reactions can be made available to the user as function blocks, which the user can assign to the diagnoses $D_x$ when implementing a diagnostic method.

The implementing of the user defined, diagnostic method is very simple and rapidly performable, since the user must specify only the structure and the procedure. The individual evaluating methods and monitoring criteria are present in the field device as flexible, usable modules and must not be created by the user.

Some possible user defined diagnostic methods will now be set forth. A very easy diagnostic method is that in which, on the basis of the clock time provided by the internal clock as input variable E, in an evaluating method EM, the duration of operation of the field device is ascertained as characterizing variable K. The corresponding monitoring criterion MK is in such case the exceeding of an allowable duration of operation. If this monitoring criterion is met, then, as diagnosis, e.g., a need for maintenance is output.

A further example is a diagnostic method, with which condensate can be detected in a container with hydrocarbon (e.g. fuel or mineral oil). For this, selected as input variable E is e.g. the echo signal of a fill-level measuring device working according to the travel time principle, wherein electromagnetic signals are guided along a waveguide. This input variable E is subjected to an evaluating method EM, which ascertains as characterizing variable K the amplitude of an echo caused by a reflection on the end of the waveguide. The monitoring criterion MK determines whether the amplitude has a positive sign, or polarity. The is the case, when a jump to a smaller waveguide impedance occurs due to condensate, while, without condensate, the free probe end produces a negative signal due to a jump to a greater waveguide impedance. If the monitoring criterion is met, then the presence of condensate in the container is output as diagnosis. A further applicable diagnostic method in connection with fill-level measuring devices working according to the travel time principle, in the case of which electromagnetic signals are guided along a waveguide, permits, for example, the detecting of foam on the surface of the fill substance. In such case, used as input variable E is, for example, likewise, the echo signal. In a first evaluating method $EM_1$, the amplitude of the echo originating from the reflection on the surface of the fill substance is ascertained as characterizing variable $K_1$. On the basis this characterizing variable $K_1$, by means of a corresponding monitoring criterion $MK_1$, it is ascertained, whether this amplitude is small. The monitoring criterion $MK_1$ is e.g. a comparison of the characterizing variable $K_1$ with a reference value. A small amplitude of the fill-level echo can be attributed either to the presence of foam or to a fill substance with a small dielectric constant. In order to be able to draw this distinction, the input variable E is subjected to a second evaluating method $EM_2$, which ascertains the amplitude of an echo caused by a reflection on the end of the waveguide as another characterizing variable $K_2$. On the basis of this second characterizing variable $K_2$, by means of a corresponding monitoring criterion $MK_1$, it is ascertained, whether the amplitude of the reflection originating from the end of the waveguide subceeds, or falls beneath, a predetermined reference value, or whether no such echo is present. If this is the case, then the fill substance has a large dielectric constant. The final diagnosis results then from the logical combining of the two monitoring criteria. If the two monitoring criteria $MK_1$ and $MK_2$ are fulfilled, then foam on the surface of the fill substance is diagnosed as cause for the low amplitude of the echo originating from the surface of the fill substance. Once the user defined diagnostic method is implemented, then it offers for the user the advantage, that the field device automatically executes diagnostic methods tailor-made for the application of the user and only delivers a diagnosis, when a fault or state to be diagnosed actually occurs. If this is not the case, then also no communication is required with the field device in this connection.

The invention claimed is:

1. A field device, comprising:
means for performing user-defined application-specific diagnostic methods, which said means are a component of a signal processing unit in the field device, an independent unit or a number of decentralized subunits, that are arranged at functionally relevant locations in the field device and connected with one another;
an input circuit, via which said means is fed at least one input variable;
an evaluation unit, which serves for deriving, on the basis of at least one input variable selected by the user and at least one evaluating method selected by the user, at least one characterizing variable, said at least one evaluating method is implemented in the form of a software module in the field device or executed by circuits specially provided for such, which are correspondingly activated by an input variable of the use:
a monitoring unit, which monitors derived characterizing variables on the basis of monitoring criteria selected by the user;
an output unit, which, upon the meeting of a monitoring criteria outputs a diagnosis associated with such monitoring criteria; and
an interface, via which a user, for each user defined application-specific diagnostic method, selects input variables, selects evaluating methods to apply to the input variables, selects monitoring criteria, and specifies the diagnosis for the output via the output unit.

2. The field device as claimed in claim 1, further comprising:
at least one memory, in which available input variables, available evaluating methods, and available monitoring criteria are stored, wherein:
said interface is connected with a display, which serves for reporting to the user the available input variables, the available evaluating methods, and the available monitoring criteria; and said interface is connected with an input means, via which the user specifies, for each user defined diagnostic method, associated input variables, evaluating methods, monitoring methods, and diagnoses.

3. The field device as claimed in claim 1, wherein:
the evaluating methods comprise static evaluations.

4. The field device as claimed in claim 1, wherein:
the monitoring criteria comprise comparisons and/or logic operations.

5. The field device as claimed in claim 1, wherein:
an internal clock is associated with said evaluation unit.

6. The field device as claimed in claim 1, wherein:
said interface is connected with a user interface having a display and an input means and the user interface is arranged directly on the field device.

7. The field device as claimed in claim 1, wherein:
the diagnosis comprises a report, which is predetermined by the user as regards content, is stored in said at least one memory in the field device, and identifies a fault or state to be diagnosed.

8. The field device as claimed in claim 7, wherein:
the diagnosis comprises a cause and/or a corrective measure, which are/is predetermined by the user as regards content, and are/is stored in said at least one memory in the field device, and are/is output together with the associated report.

9. A method for implementing a user defined, application-specific diagnostic method in a field device comprising the steps of:

the user selects from available input variables the input variables relevant for the diagnostic method and stores such in a field device;

the user selects from available evaluating methods the evaluating methods relevant far the diagnostic method and specifies, to which of the selected input variables they should be applied;

the evaluating methods are implemented in the form of software modules in the field device or executed by circuits specially provided for such, which are correspondingly activated by input variable of the user, the user selects from available monitoring criteria the monitoring criteria relevant for the diagnostic method and specifies the characterizing variable, to which they should be applied; and the user specifies for each monitoring criterion an associated diagnosis, which is output by a diagnostic output upon the meeting of such monitoring criterion.

\* \* \* \* \*